US009507713B1

(12) United States Patent
Payer et al.

(10) Patent No.: US 9,507,713 B1
(45) Date of Patent: Nov. 29, 2016

(54) MEMORY OBJECT PRETENURING

(71) Applicant: GOOGLE INC., Mountain View, CA (US)

(72) Inventors: Hannes Payer, Munich (DE); Daniel Clifford, Vaterstetten (DE); Michael Vincent Stanton, Munich (DE); Benedikt Meurer, Ottobrunn (DE)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 14/492,845

(22) Filed: Sep. 22, 2014

(51) Int. Cl.
*G06F 12/02* (2006.01)

(52) U.S. Cl.
CPC ..... *G06F 12/0253* (2013.01); *G06F 2212/702* (2013.01)

(58) Field of Classification Search
CPC .... G06F 12/023; G06F 3/067; G06F 9/5016; G06F 3/0605; G06F 3/0631; G06F 12/02; G06F 12/0253
See application file for complete search history.

(56) References Cited

U.S. PATENT DOCUMENTS

| 7,404,182 B1* | 7/2008 | Garthwaite | G06F 12/0269 707/999.202 |
| 7,596,667 B1* | 9/2009 | Detlefs | G06F 12/0276 711/159 |
| 7,606,989 B1* | 10/2009 | Detlefs | G06F 12/0276 711/159 |
| 8,504,594 B2* | 8/2013 | Izumi | G06F 12/0253 707/813 |
| 8,555,255 B2* | 10/2013 | Odaira | G06F 8/24 717/127 |
| 8,826,256 B2* | 9/2014 | Doyle | G06F 8/4442 717/156 |
| 2002/0133533 A1* | 9/2002 | Czajkowski | G06F 9/5016 718/107 |

(Continued)

OTHER PUBLICATIONS

Blackburn, et al, "Profile-based pretenuring," ACM Transactions on Programming Languages and Systems, vol. 27, iss. 1, 2007, 53 pages.

(Continued)

*Primary Examiner* — Sean D Rossiter
*Assistant Examiner* — Jean Edouard
(74) *Attorney, Agent, or Firm* — Brake Hughes Bellermann LLP

(57) ABSTRACT

A computer-implemented method can include receiving a set of software instructions for execution by a computing device and compiling the set of software instructions to generate a set of executable instructions. The compiling can include identifying a first memory object allocation instruction. The method can also include executing the set of executable instructions, where the executing includes allocating, in a young garbage collection generation, a plurality of memory objects with the first memory object allocation instruction. The method can further include determining a survival rate of the plurality of memory objects allocated by the first memory object allocation instruction. Responsive to the survival rate being larger than a survival rate threshold, the method can include replacing, in the set of executable instructions, the first memory object allocation instruction with a second memory object allocation instruction that is configured to directly allocate memory objects in an old garbage collection generation.

17 Claims, 6 Drawing Sheets

(56) References Cited

U.S. PATENT DOCUMENTS

| | | | |
|---|---|---|---|
| 2004/0088277 A1* | 5/2004 | Garthwaite | G06F 12/0276 |
| 2004/0111449 A1* | 6/2004 | Garthwaite | G06F 12/0276 |
| 2004/0111573 A1* | 6/2004 | Garthwaite | G06F 12/0276 711/159 |
| 2004/0172507 A1* | 9/2004 | Garthwaite | G06F 12/0276 711/159 |
| 2007/0180002 A1* | 8/2007 | Printezis | G06F 12/0276 |
| 2011/0302183 A1* | 12/2011 | Van De Vanter | G06F 9/44 707/758 |
| 2012/0185741 A1* | 7/2012 | Grekhov | G06F 11/362 714/719 |
| 2013/0283248 A1* | 10/2013 | Abadi | G06F 8/76 717/136 |
| 2013/0318132 A1* | 11/2013 | Basu | G06F 12/0276 707/816 |
| 2013/0339568 A1* | 12/2013 | Corrie | G06F 12/023 711/6 |
| 2014/0082315 A1* | 3/2014 | Moser | G06F 12/0253 711/170 |

OTHER PUBLICATIONS

Marion, et al, "Decrypting The Java Gene Pool: Predicting objects' lifetimes with micro-patterns" ISMM '07, Oct. 21-22, 2007, 12 pages.

Harris, "Dynamic adaptive pretenuring", Proceedings of the 2nd International Symposium on Memory Management, 2000, pp. 127-136.

* cited by examiner

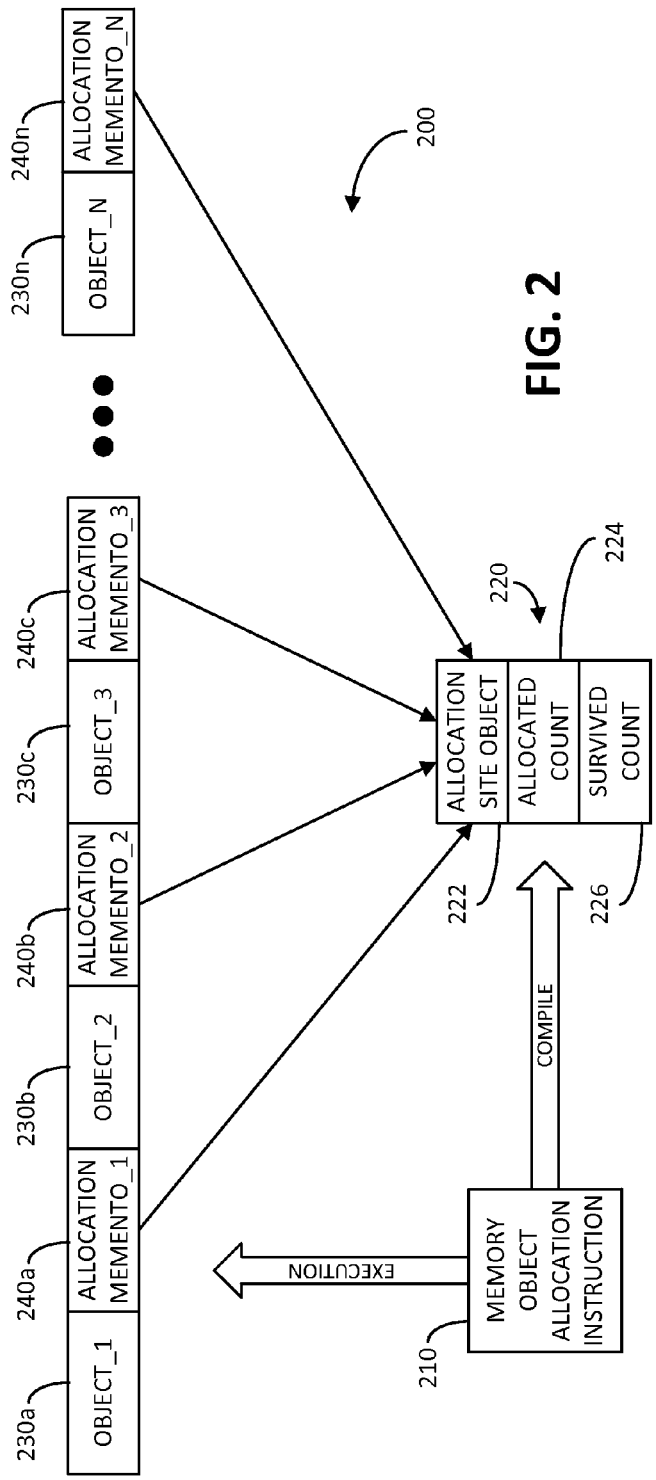
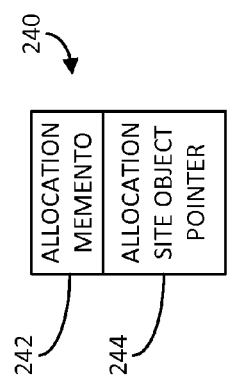
FIG. 2
FIG. 3

MEMORY OBJECT PRETENURING

TECHNICAL FIELD

This disclosure relates to allocation of memory objects. More specifically, this disclosure relates to approaches for pretenuring memory objects when using a generational garbage collection.

BACKGROUND

Software applications that rely on automatic memory management are becoming more and more prevalent. Such applications may be implemented as traditional consumer desktop applications, in large scale data analysis computing systems, on high-performance web servers, on financial trading platforms, and can be included in ever-more demanding (e.g., memory intensive) websites. Such applications are even available for use on the billions of mobile phones and other mobile computing devices that exist world-wide, as well as for implementation by embedded computing devices. Accordingly, reducing the costs (e.g., performance costs) of automatic memory management is of principal importance in best utilizing computing resources across the entire spectrum of available devices, and for achieving improved throughput (performance), so as to improve the experience of users of such applications.

Many automatic memory management systems utilize garbage collection, such as may be implemented using a generational garbage collector, to remove memory objects that are no longer needed (e.g., outdated objects) by a given application, as part of managing memory that is assigned to the application by a computing device on which the application (program) is executing (running). Garbage collection (e.g., generational garbage collection) can also be used to defragment a block of memory that is associated with a given program. Such a defragmentation process can group (move) live (active) memory objects together in memory (e.g., in contiguous blocks of memory) and, as a result, free up larger blocks (sections, chunks, etc.) of available (free, unassigned, and so forth) memory space by eliminating portions of free memory that are located between live objects (resulting in fragmented memory). These portions of unused (fragmented) memory may, for instance, be associated with objects that are no longer being used by the given application (which can also be referred to as "dead" objects).

Garbage collection, however, can introduce overhead in the associated application's main execution path. While some garbage collection work can be done incrementally, in parallel with the application, or even concurrently with the application, the performance costs associated with garbage collection still remain. Such performance costs can be associated with moving (copying) memory objects from one generation (e.g., a young garbage collection generation) to a second generation (an old or older garbage collection generation). This performance cost can be even more apparent in garbage collectors that target low pause time (e.g., where garbage collection does not affect a user's perception of performance during application execution) and/or for applications where a relatively high percentage of allocated memory objects "survive" a given garbage collection generation (e.g., remain live), and have to be moved from one a young or younger generation to an old, or older generation during a garbage collection process.

SUMMARY

According to one general aspect, a computer-implemented method can include receiving, at a computing device, a set of software instructions for execution by the computing device and compiling the set of software instructions to generate a set of executable instructions. The compiling can include identifying a first memory object allocation instruction. The computer-implemented method can further include executing, by the computing device, the set of executable instructions. The executing can include allocating, in a young garbage collection generation, a plurality of memory objects with the first memory object allocation instruction. The computer-implemented method can also include determining a survival rate of the plurality of memory objects allocated by the first memory object allocation instruction. Responsive to the survival rate being larger than (or greater than or equal to) a survival rate threshold, the computer-implemented method can include replacing, in the set of executable instructions, the first memory object allocation instruction with a second memory object allocation instruction that is configured to directly allocate memory objects in an old garbage collection generation.

In another general aspect, a non-transitory recordable storage medium can have instructions recorded and stored thereon. The instructions, when executed by a computing device, can cause the computing device to receive a set of software instructions for execution by the computing device and compile the set of software instructions to generate a set of executable instructions. The compiling can include identifying a first memory object allocation instruction. The instructions, when executed by the computing device, can further cause the computing device to execute the set of executable instructions, where the executing can include allocating, in a young garbage collection generation, a plurality of memory objects with the first memory object allocation instruction. The instructions, when executed by the computing device, can also cause the computing device to determine a survival rate of the plurality of memory objects allocated by the first memory object allocation instruction and, responsive to the survival rate being larger than (or greater than or equal to) a survival rate threshold, replace, in the set of executable instructions, the first memory object allocation instruction with a second memory object allocation instruction that is configured to directly allocate memory objects in an old garbage collection generation.

In another general aspect, a system can include a first compiler configured to receive a set of software instructions and generate a set of executable instructions from the set of software instructions. The compiling can include identifying a memory object allocation instruction in the set of software instructions and allocating a bookkeeping object associated with the memory object allocation instruction. The bookkeeping object can be configured to maintain information for determining a survival rate of a plurality of memory objects allocated by the memory object allocation instruction. The system can include an execution engine configured to execute the set of executable instructions including updating, in the information for determining the survival rate, a count of a number of allocated memory objects allocated by the memory object allocation instruction. The system can also include a garbage collector configured to update, in the information for determining the survival rate, a count of live memory objects of the plurality of memory objects allocated by the memory object allocation instruction. The system can further include a second compiler configured to determine the survival rate based on the survival rate information. Responsive to the survival rate being larger than (or greater than or equal to) a survival rate threshold, the second compiler can be configured to replace, in the set of executable instructions, the memory object allocation instruction with an old-generation memory object allocation instruction that is configured to directly allocate memory objects in an old garbage collection generation. Responsive to the survival rate being less than or equal to (or less than) a survival rate threshold, the second compiler can be configured to replace, in the set of executable instructions, the memory object allocation instruction with a young-generation memory object allocation instruction that is configured to directly allocate memory objects in a young garbage collection generation.

The details of one or more implementations are set forth in the accompanying drawings and the description below. Other features will be apparent from the description and drawings, and from the claims.

BRIEF DESCRIPTION OF THE DRAWINGS

FIG. 2 is a schematic diagram illustrating an approach for collecting lifetime information for allocated memory objects to use to make pretenuring decisions, according to an implementation.

FIG. 3 is a schematic diagram illustrating an allocation memento object that may be used in conjunction with the approach illustrated in FIG. 2, according to an implementation.

Like reference symbols in the various drawings indicate like elements.

DETAILED DESCRIPTION

Figure 1:
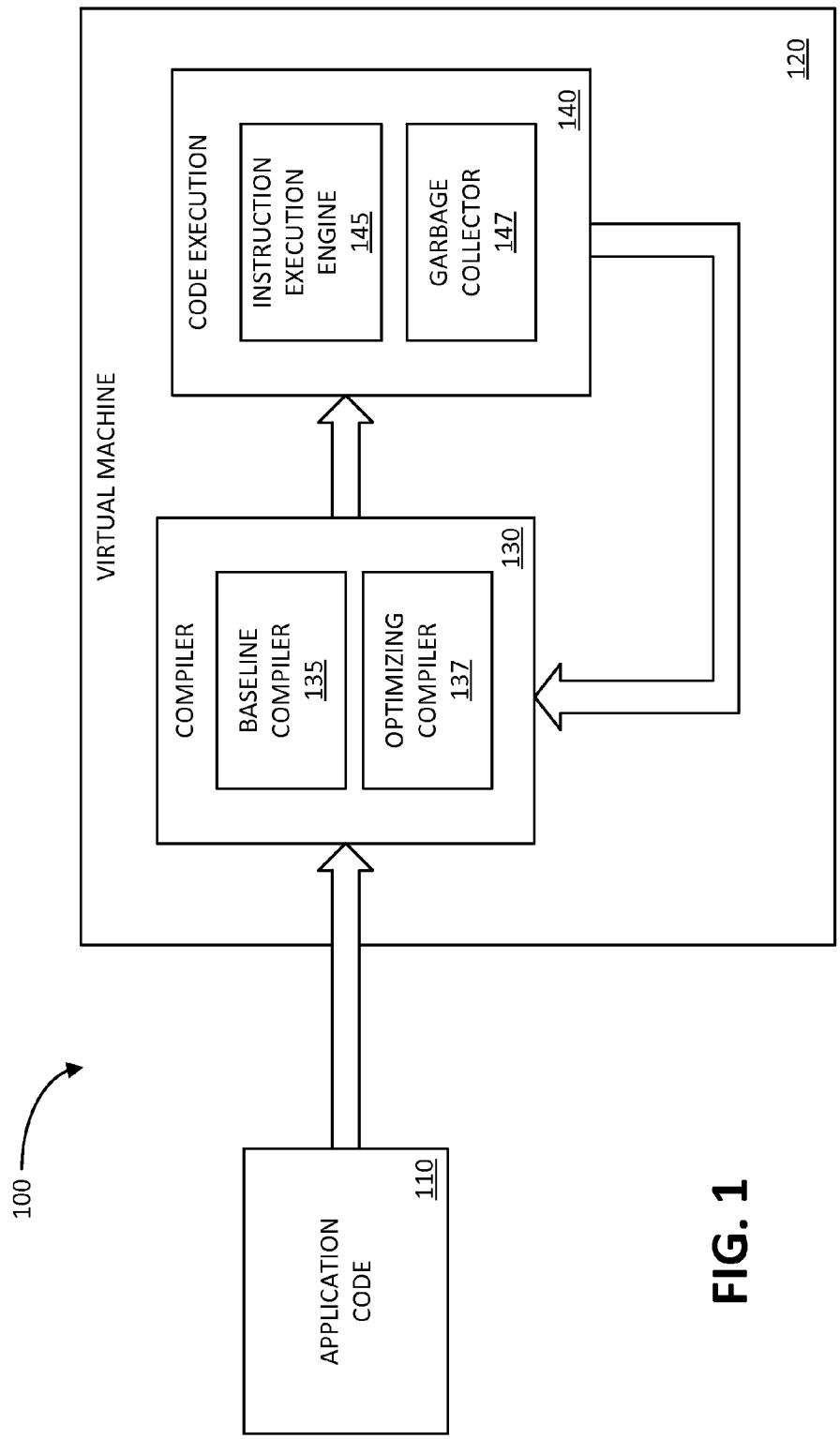
FIG. 1 is a block diagram illustrating a system that can be used to implement memory object pretenuring, according to an implementation.

FIG. 1 is a block diagram illustrating a system 100 that can be used to implement memory object pretenuring, such as using the techniques described herein, according to an implementation. Briefly, object pretenuring can include allocating memory objects that have a given percentage of objects generated by a specific allocation instruction survive (e.g., above a given survival threshold) a young (or younger) garbage collection generation directly in an old (or older) garbage collection generation. Accordingly, such memory object pretenuring can reduce the number of memory objects that are copied from younger garbage collection generations to older garbage collection generations during execution of an associated application. Such reduction in the moving/copying of objects between garbage collection generations can reduce the overhead associated with garbage collection and improve the runtime performance of the associated application.

Techniques for object pretenuring (e.g., such as those described herein) can include replacing, during runtime, memory object allocation instructions in a set of executable instructions that allocate memory objects in a young garbage collection generation with instructions that directly allocate memory objects in a specific (e.g., old or older) garbage collection generation. In such approaches (which can be implemented in the system 100), an arbitrary number of garbage collection generations can be used (defined, implemented, and so forth) by a garbage collector. For instance, in one embodiment, a garbage collector may use two garbage collection generations (e.g., a young generation and an old generation) to manage allocated memory objects. In another implementation, a garbage collector may use three garbage collection generations (e.g., a young generation, a middle generation and an old generation) to manage allocated memory objects. In still other implementations, a garbage collector may use more than three garbage collection generations to manage allocated memory objects.

In each of the example approaches noted above, if a given memory object is "live" (e.g., is still being used by executable instructions associated with a compiled application) when a garbage collection cycle is performed, the garbage collector can copy (move) that object from a younger generation to an older generation (e.g., to free up, by removing dead objects, and/or defragment memory allocated for the younger garbage collection generation). Such copying may also include updating pointers and references associated with live memory objects that are copied (moved) to older garbage collection generations, which can further contribute to performance delays associated with the garbage collection process.

When an object (memory object) is copied (moved) to the oldest garbage collection generation for a given implementation, it may be referred to as "tenured", as that object is no longer subject to being copied (moved) from one (younger) generation to an older generation (as it is now in the oldest generation), and the memory allocated to the tenured object will be collected by the garbage collector when, e.g., execution of the associated application is terminated or the object it no longer needed by the application (e.g., the object is dead). Memory object pretenuring can be used to directly allocate such memory objects in an oldest garbage collection generation, which reduces the overhead and performance impact associated with moving such memory objects during garbage collection processes.

For purposes of clarity and illustration, the following discussion will be made, generally, in the context of a garbage collector that is implemented using two garbage collection generations, a young generation and an old generation. However, the techniques described herein may be used in systems where more than two garbage collection generations are used.

As illustrated in FIG. 1, application code 110, which may include a set of software instructions for implementing an application (a user application, a software application, etc.) may be provided to a virtual machine 120 that includes a compiler 130. The virtual machine 120 may be implemented on a computing device (not shown) and may emulate operation of the architecture of a particular computing system (or systems). A computing device used to implement the virtual machine 120 may take a number of forms. For instance, such a computing device may be a laptop computer, a server, a mobile computing device, such as a smartphone or tablet, an embedded computing device, etc.

Depending on the particular implementation, the virtual machine 120 may be implemented using hardware, software and/or firmware, or any appropriate combination thereof. The configuration of the system 100 is shown by way of example, and for purposes of illustration. In other approaches, the application code 110 may be executed in other manners, such as using a device with a conventional computing system architecture that includes a traditional operating system, rather than using the virtual machine 120.

Use of a virtual machine, such as the virtual machine 120 (or different virtual machines), may, however, be advantageous as the virtual machine 120 (or different virtual machines) may be used to implement (emulate) a number of different computing architectures using a single computing system or computing device. For purposes of illustration and clarity, the techniques described herein will be described as being implemented using the virtual machine 120, though in other implementations, other approaches may be used.

In the system 100 shown in FIG. 1, the compiler 130 of the virtual machine 120 may convert the software instructions of the application code 110 to executable instructions (e.g., machine language instructions or the like), which can be directly executed by a code execution module 140 of the virtual machine 120. In other implementations, the compiler 130 can convert the application code 110 to an intermediate representation (IR) that is expressed by a programming language (e.g., using run-time interpretable instructions, or the like) such as Java, JavaScript, or other such programming languages. In such arrangements, the code execution module 140 of the virtual machine 120 can be configured to interpret the instructions of the IR for execution. For instance, in the foregoing approaches, an instruction execution engine 145 included in the code execution module 140 can be configured to execute and/or interpret instructions that are provided to the virtual machine 120 by the compiler 130.

For purposes of clarity and simplicity, the following discussion may interchangeably refer to execution of the application code 110, execution of the compiled application code 110, execution of executable instructions associated with the application code 110, and so forth. In such instances, it will be understood that execution of the application code 110 (or specific instructions of the application code 110) can include compiling the instructions of the application code 110 (e.g., with the compiler 130) to generate corresponding executable and/or interpretable instructions.

As illustrated in FIG. 1, the compiler 130 includes a baseline compiler 135 and an optimizing compiler 137. In the system 100, the baseline compiler 135 may be configured to quickly generate executable (or interpretable) instructions for the application code 110 without performing analysis of the code in order to implement efficiency improvements in the executable instructions. For instance, the baseline compiler 135 may not perform any static analysis of the application code 110 when generating a corresponding set of executable instructions. This approach allows for quick execution startup of the application code 110 when launched on a computing device that includes the virtual machine 120, as compilation of the application code 110 by the baseline compiler 135 can be performed quickly as compared to a compiler that performs static analysis of the application code 110.

In the system 100, the optimizing compiler 137 may be configured to receive information, from the code execution module 140, about runtime behavior of the application code 110. Based on this runtime information, the optimizing compiler 137 can make changes to the executable instructions generated by the baseline compiler 135 in order to improve the performance and efficiency of the application code 110 by the virtual machine 120 while the application code 110 is executing. For example, the code execution module 140 may identify portions of executable instructions that are executed frequently (e.g., relatively more often than other portions of the executable instructions). In response to this information, the optimizing compiler 137 may analyze the frequently executed portions of the executable instructions and implement changes in those instructions to allow for more efficient execution.

As shown in FIG. 1, the code execution module 140 can include the instruction execution engine 145 and a garbage collector 147 (e.g., a generational garbage collector). In the virtual machine 120, the instruction execution engine 145 of the code execution module 140 may include hardware, software and/or firmware that emulates a specific microprocessor architecture. The code execution module 140 can also have access to the resources of a computing device in which the virtual machine 120 is implemented to facilitate execution of the instructions. Such resources may include volatile system memory (e.g., random access memory (RAM)), peripheral devices, nonvolatile memory, etc.

In such an arrangement, the instruction execution engine 145 and the garbage collector 147 (as well as other components of the code execution module 140) may operate in conjunction with one another to execute the instructions of the compiled application code that is provided to the code execution module 140 by the compiler 130, as well as provide runtime information about execution of the compiled application code to the compiler 130. The optimizing compiler 137 may use then use the runtime information to improve the efficiency of the compiled application code. In other implementations, other configurations for compiling the application code 110, executing the compiled instructions of the application code 110 and improving the efficiency of the compiled instructions can be used.

In an implementation, the code execution module 140 can provide, to the compiler 130, lifetime information about memory objects that are allocated by the executable instructions for the application code 110. The optimizing compiler 137 may use this lifetime information to determine whether to replace memory allocation instructions included in the executable instructions generated by the baseline compiler 135 with instructions to directly allocate a given memory object (or objects) in an old garbage generation (pre-tenure) or to directly allocate the given memory object (or objects) in a young garbage collection generation (not-tenure).

Further, the executable instructions for the application code 110 that are generated by the baseline compiler 135 can be configured, when executing in the code execution module 140, to collect the lifetime information for allocated memory objects that is used (e.g., by the optimizing compiler 137) to make pretenuring decisions. Such pretenuring approaches may improve the performance and efficiency of the executable instructions for the application code 110, as they can reduce the number of objects that need to be moved (copied) from the young garbage collection generations to the old garbage collection generations.

As discussed above, in the system 100, the garbage collector 147 can be implemented as a generational garbage collector. The (generational) garbage collector 147 can use a semi-space strategy that classifies objects as "young generation" objects, which have not yet been observed and/or moved by the garbage collector 147, and "old generation" objects, which have been previously observed and/or moved by the garbage collector. In such approaches, the garbage collector 147 can be configured to perform frequent minor collections of the young generation objects, and may also be configured to implement a mark-and-sweep collector with incremental marking for major collections of the old generation objects. Garbage collection may triggered, for example, when memory (e.g., RAM) that is allocated to a specific garbage collection generation has been fully allocated, or reaches an allocation threshold. The garbage collection process may then be used to free up and/or defragment that memory by collecting memory from dead objects and/or moving objects from the young generation to the old generation.

FIG. 2 is a schematic diagram 200 illustrating an approach that can be used for collecting lifetime information for making memory object allocation pretenuring decisions, according to an implementation. For purposes of illustration, the diagram 200 will be discussed with further reference to the system 100 of FIG. 1. The approach illustrated by FIG. 2, however, can be implemented in connection with virtual machines and/or computing devices having other configurations.

The diagram 200 of FIG. 2 shows a memory object allocation instruction (instruction) 210, which can be included in the application code 110. The instruction 210 may be one of a plurality of memory object allocation instructions in the application code 110. It will be appreciated that the approaches described below with respect to the instruction 210 can also be applied to other memory object allocation instructions in the application code 110, and that the instruction 210 and the schematic diagram 200 are shown by way of example.

FIG. 2 illustrates an approach where the instruction 210, when compiled by the compiler 130 and executed by the code execution module 140 of the system 100, can allocate one or more memory objects for use by the application code 110 during its execution (which can be referred to as application memory objects 230) and can also allocate one or more memory objects for gathering lifetime information for the application memory objects 230 (which can be referred to as instrumentation objects). For instance, the diagram 200 illustrates an example approach where the instruction 210 is compiled by the baseline compiler 135 such that the instrumentation objects are allocated either by the baseline compiler 135 or while executing the application code 110. Said another way, in such an approach, when compiling and executing the application code 110, instrumentation objects can be allocated in addition to any application memory objects 230 that are allocated by the instruction 210.

In an implementation, as noted above, the code execution module 140 can use these instrumentation objects to collect lifetime information for application memory objects that are allocated by the instruction 210 (e.g., where the application memory objects are directly used by the application code 110 during its execution). That collected lifetime information may be used (e.g., during or after a garbage collection process) to make a pretenuring decision for application memory objects 230 that are allocated by the instruction 210 (e.g., for application memory objects 230 allocated after the pretenuring decision) using the approaches described herein. In this example, once a pretenuring decision (e.g., to tenure or not-tenure) is made for application memory objects 230 allocated by the instruction 210, the optimizing compiler 137 may replace the executable instruction(s) corresponding with the instruction 210 that were generated by the baseline compiler 135 with an instruction (or instructions) to directly allocate tenured (old generation) memory objects or to directly allocate non-tenured (young generation) memory objects, and no longer allocate the instrumentation objects (e.g., no longer collect lifetime information for application memory object 230 allocated by the instruction 210). As indicated above, the approach shown in FIG. 2 can be applied to make respective pretenuring decisions for memory objects that are allocated by each memory allocation instruction in the application code 110 (or memory allocation instructions in other sets of application code).

As shown in FIG. 2, the baseline compiler 135, when compiling the instruction 210, can allocate an allocation site object 220, which is an instrumentation object that can be used as a bookkeeping mechanism for collecting lifetime data for application memory objects 230 that are allocated by instruction 210. In one implementation, the allocation site object 220 can be allocated on the same memory heap that is assigned to the virtual machine 120 for execution of the application code 110 and, in such an approach, the allocation site object 220 would be subject to garbage collection by the garbage collector 147 when it is no longer needed (e.g., becomes a dead object).

As shown in FIG. 2, the allocation site object 220 includes a type field 222 that identifies it as an allocation site object. The baseline compiler 135 can associate the instruction 210 with the allocation site object 220 for the purposes of maintaining the bookkeeping (lifetime) information for application memory objects 230 that are allocated by the instruction 210.

As shown in the diagram 200, the bookkeeping information of the allocation site object 220 includes an allocated count field 224 that can be used to maintain a count of the number of application memory objects 230 that are allocated by the instruction 210. For instance, each time the instruction 210 is executed (e.g., to allocate an application memory object 230), the value of the allocated count field 224 may be incremented as part of executing the instruction 210. In an implementation, a set of executable instructions generated by the baseline compiler 135 corresponding with the instruction 210 may include instructions for updating (incrementing) the allocated count field 222.

The allocation site object 220 also includes a survived count field 226. The survived count field 226 can be used to maintain a count of a number of application memory objects 230 allocated by the instruction 210 that survive the young garbage collection generation (e.g., and are copied to the old garbage collection). Using the values of the allocated count field 224 and the survived count field 226, a survival rate (percentage) of application memory objects 230 that survive the young generation can be calculated. Depending on the particular implementation, the survival rate can be determined by the garbage collector 147 or, alternatively, can be determined by the optimizing compiler 137 using lifetime information (e.g., from the allocation site object 220) provided to the compiler 130 by the code execution module 140.

In some implementations, the bookkeeping information in the allocated count field 224 and the survived count field 226 (e.g., for memory object allocation instructions that were not previously modified by the optimizing compiler 137 in response to a pretenuring decision) can be reset to zero after each garbage collection cycle. In other implementations, the bookkeeping information in the allocated count field 224 and the survived count field 226 can aggregate throughout execution of the application code 110.

As also shown in FIG. 2 and discussed above, each time the instruction 210, as compiled by the baseline compiler 135, executes, an application memory object 230 can be allocated. For instance, the first time the instruction 210 is executed, object_1 230$a$ can be allocated, the second time the instruction 210 is executed, object_1 230$b$ can be allocated, the third time the instruction 210 is executed, object_1 230$c$ can be allocated and the $N^{th}$ time the instruction 210 is executed, object_1 230$n$ can be allocated. The numbering of the allocated application memory objects 230 in FIG. 2 is given by way of example and a number of approaches are possible. Further, for each application memory object 230 that is allocated by execution of the compiled instruction 210 (from the baseline compiler 135), the compiled instruction 210 (which can include multiple instructions) can also update (increment) the allocated count field 224 of the allocation site object 220.

In addition to allocating the application memory objects 230, the executable instruction(s) corresponding with the instruction 210 that are generated by the baseline compiler 135, when executed by the code execution module 140, can also allocate another respective instrumentation object, which, as shown in FIG. 2, can take the form of respective allocation mementos 240. As shown in FIG. 2, each allocation memento 240 corresponds with a respective application memory object 230. In this example approach, the allocation mementos 240, which may be referred to as "shadow objects", are allocated directly behind their corresponding memory objects 230 (e.g., on the same memory heap). In certain implementations, the allocation mementos 240 may not be directly reachable (accessible) by the application code 110.

An example allocation memento 240 is illustrated in FIG. 3 (as a schematic diagram) and includes a type field 242 that designates it as an allocation memento. The allocation memento 240 also includes an allocation object site pointer field (pointer) 244 that points back to its corresponding allocation site object 220, as is shown in FIG. 2. During a garbage collection process, the respective allocation memento 240 associated with each of application memory object 230 that is marked as live by the garbage collector 147 can be used to update (increment) the survived count field 226 in the allocation site object 220.

For instance, when the garbage collector 147 locates an application memory object 230 that is live (e.g., has survived the young garbage collection generation and is still being used by the application code 110) it can look for an associated application memento 240 behind the live application memory object 230. If the garbage collector 147 finds an application memento 240 behind the live application memory object 230, the garbage collector can examine the pointer 244 of the allocation memento 240 to identify the associated allocation site object 220. The garbage collector 147 (or the code execution module 140) can then use the pointer 244 to increment the value in the survived count field 226 of the associated allocation site object 220.

Similarly to the application memory objects 230, the first time the instruction 210 (as generated by the baseline compiler 135) is executed, allocation memento 240a can be allocated behind the object 230a, the second time the instruction 210 is executed, allocation memento 240b can be allocated behind the object 230b, the third time the instruction 210 is executed, allocation memento 240c can be allocated behind the object 230c and the $N^{th}$ time the instruction 210 is executed, allocation memento 240n can be allocated behind the object 230n. The numbering of the allocation mementos in FIG. 2 is given by way of example and a number of approaches are possible.

When executing the application code 110 with the virtual machine 120, garbage collection can be triggered in response to a number of events. For instance, garbage collection may be triggered in response to an indication that a block of memory (e.g., a portion of a memory heap allocated to the application 110 during its execution) that is designate (e.g., by the virtual machine 120) for storing young generation memory objects is fully allocated, or has reached an allocation threshold. In other instances, garbage collection may be triggered in response to an indication that the memory heap allocated to the virtual machine for execution of the application code has reached an allocation threshold. Of course, garbage collection may be triggered in response to other events. The specific allocation thresholds used to trigger garbage collection will depend on the specific implementation.

As noted above, as part of a garbage collection process implemented by the garbage collector 147 during execution of the application code 110, lifetime data that is collected for application memory objects 230 using the instrumentation objects (e.g., the allocation site object 220 and the allocation mementos 240) can be used to make a pretenuring decision for the memory object allocation instruction 210 (as well as other memory object allocation instructions of the execution code 110).

Figure 4:
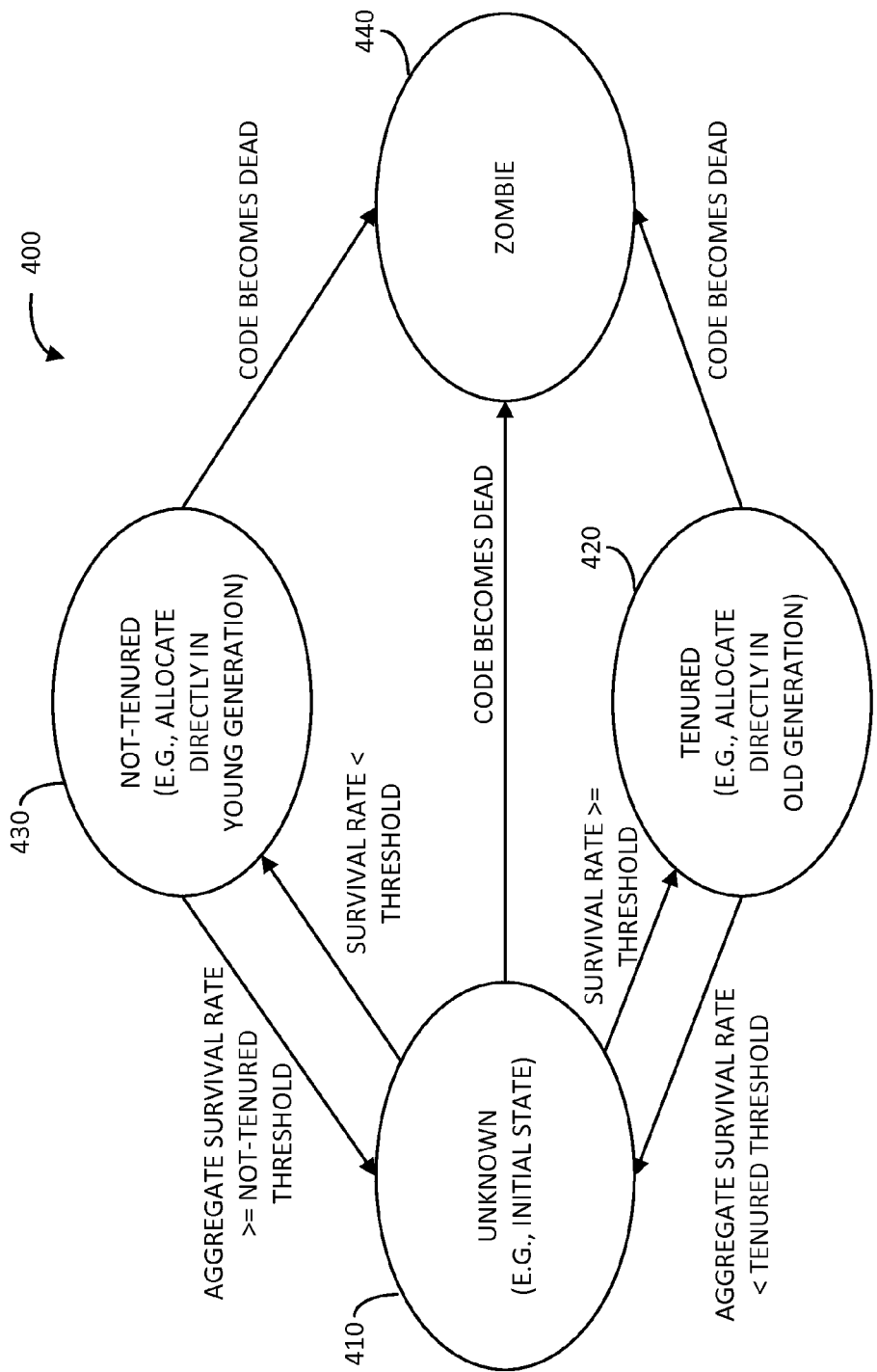
FIG. 4 is a state diagram illustrating memory object pretenuring, according to an implementation.

FIG. 4 is a state diagram 400 illustrating a logic flow for making memory object pretenuring decisions, according to an implementation. For purposes of illustration and clarity, the state diagram 400 will be described, generally, with respect to making a pretenuring decision using the embodiments and techniques illustrated in FIGS. 1-3 and described above. The techniques discussed with respect to FIG. 4 can, however, be applied for making pretenuring decisions for other memory object allocation instructions of the application code 110 (as well as for memory object allocation instructions of other applications), and/or in systems or virtual machines having other configurations, or that collect lifetime data using different approaches.

As shown in FIG. 4, the state diagram 400 includes four states associated with allocation of application memory objects 230: an unknown (e.g., an initial state for application memory objects 230 before a pretenuring decision is made with respect to the instruction 210) 410; a tenured state 420 (e.g., where application memory objects 230 are allocated directly in the old garbage collection generation); a not-tenured state 430 (e.g., where application memory objects 230 are allocated directly in the young garbage collection generation); and a zombie state 440 (e.g., which can be used to keep the allocation site object 220 alive for an additional garbage collection cycle if the application code becomes dead (its execution is terminated)).

In the state diagram 400, the initial state 410 may correspond with application memory objects 230 that are allocated using executable instructions that are generated by the baseline compiler 135 (e.g., for which instrumentation objects are also allocated and lifetime information is being collected). For application memory objects 230 in the initial state 410, a pretenuring decision may not yet have been made. For example, the application code 110 may have just begun execution and a garbage collection cycle may have not yet been triggered. In other instances, pretenuring decisions may only be made for memory object allocation instructions that are frequently executed, which may be determined using an allocation rate threshold. For example, if the instruction 210 is not executed frequently, the value in the allocation count field 222 of the allocation site object may not be large enough, when compared to the allocation rate threshold, to trigger a pretenuring decision for the instruction 210. In such situations, a pretenuring decision may not be made with respect to the instruction 210 during execution of the application code 110. The specific allocation rate threshold to determine whether to make a pretenuring decision will depend on the particular implementation.

In still other instances, a previous pretenuring decision may have been invalidated because, in the aggregate for the application code 110, too many not-tenured application memory objects (state 430) are surviving the young garbage collection generation and being moved to the old generation or, alternatively, not enough tenured application objects (state 420) are remaining alive in the old generation (e.g., too many tenured objects are dying in the old generation). Such overturning of previous pretenuring decisions may be performed in response to, respectively, an aggregate young generation memory object survival rate being greater than or equal to a non-tenured threshold, or an aggregate old generation memory object survival rate being less than a tenured threshold value. The specific aggregate threshold rates used to invalidate previous pretenuring decisions will depend on the particular implementation.

If a previous pretenuring decision is invalidated, executable instructions corresponding with the instruction 210 that were generated by the optimizing compiler 137 (states 420 and 420) can be replaced with executable instructions corresponding with the instruction 210 generated by the baseline compiler 135 (state 410) and collection of lifetime data for the application memory objects 230, using the instrumentation objects discussed above, may resume while the allocation of the memory objects 230 is associated with the state 410 (e.g., until another, if any, pretenuring decision is made).

Using the above example, when a garbage collection processes is triggered and a value in the allocated count field 224 of the allocation site object 220 is above an associated allocation threshold value, a pretenuring decision for application memory object 230 allocated by the instruction 210 can be made in accordance with the state diagram 400. For instance, if the survival rate determined by the values in the allocated count field 224 and the survived count field 226 of the allocation site object 220 is less than an associated survival rate threshold, the state diagram can move from state 410 to 430 and executable instructions associated with the instruction 210 generated by the baseline compiler 135 can be replaced, by the optimizing compiler 137, with executable instructions that directly allocate the application memory objects 230 in the young garbage collection generation. Further, while allocation of the application memory objects 230 is associated with state 430, lifetime data using the instrumentation objects may not be collected.

If, instead, the survival rate determined by the values in the allocated count field 224 and the survived count field 226 of the allocation site object 220 is greater than or equal to the survival rate threshold, the state diagram can move from state 410 to 420 and executable instructions associated with the instruction 210 generated by the baseline compiler 135 can be replaced, by the optimizing compiler 137, with executable instructions that directly allocate the application memory objects 230 in the old garbage collection generation (state 420). Further, while allocation of the application memory objects 230 is associated with the state 420, lifetime data using the instrumentation objects may not be collected. As with the other threshold values described herein, the specific survival rate threshold associated with moving from the state 410 to either the state 420 or the state 430 of the state diagram 400 will depend on the specific implementation.

As shown in the state diagram 400, regardless of whether the allocation of application memory objects 230 by the instruction 210 is associated with the state 410, the state 420, or the state 430, if the application code 110 becomes dead (e.g., terminates execution), the state diagram 400 moves to the zombie state 440. In this situation, during the first garbage collection cycle that is triggered after moving to the zombie state 440, the code object (the executable instructions) associated with the application code 110 can be collected. However, in this situation, application memory objects associated with the state 410 may have been generated by one or more memory allocation instructions included in the application code 110 since the last garbage collection cycle. These application memory objects 230 can have associated allocation site objects 220 and allocation mementos 240 present in memory. If the allocation site objects 220 are collected in the garbage collection cycle that occurs immediately after the application code 110 becomes dead, the pointers 244 of the allocation mementos 240 would no longer point to their respective allocation site objects 220 (as the allocation site objects 220 would no longer exist), which could create blocks of unused memory (associated with the allocation mementos 240) that do not get collected by the garbage collector 147.

In order to avoid this situation, allocation site objects 220 associated with the application code 110 are artificially kept as live objects until the second garbage collection cycle that is triggered after the application code 110 becomes dead. Such an approach ensures that no additional application memory objects 230 are generated after collection of the code object associated with the application code 110 at the first garbage collection cycle that occurs after the application code 110 becomes dead. Accordingly, it is therefore safe to collect the allocation site objects 220 during the second garbage collection cycle, as all of the allocation mementos 240 will have been collected during the first garbage collection cycle that occurs after the application code 110 becomes dead.

Figure 5A:
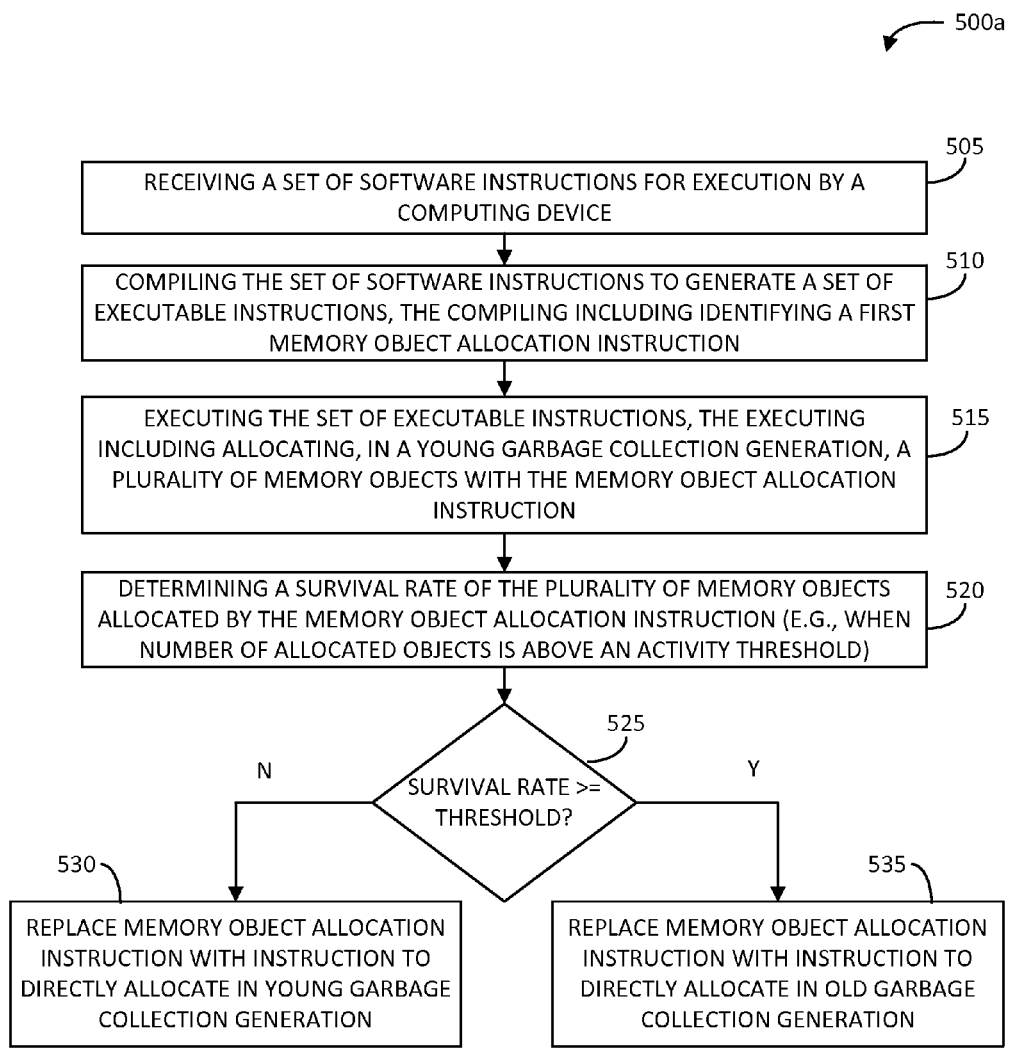
FIGS. 5A-5C are flowcharts illustrating methods for memory object pretenuring, according to an implementation.
Figure 5B:
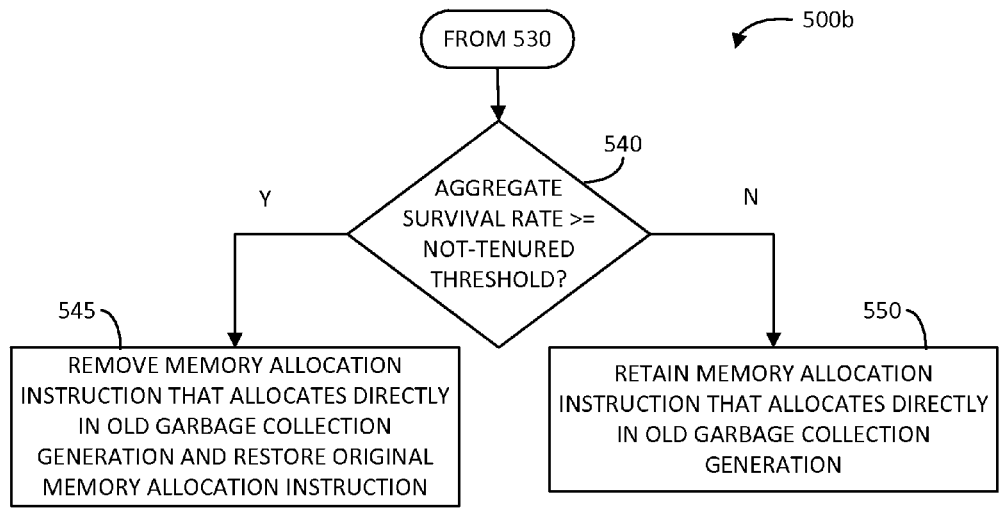
Figure 5C:
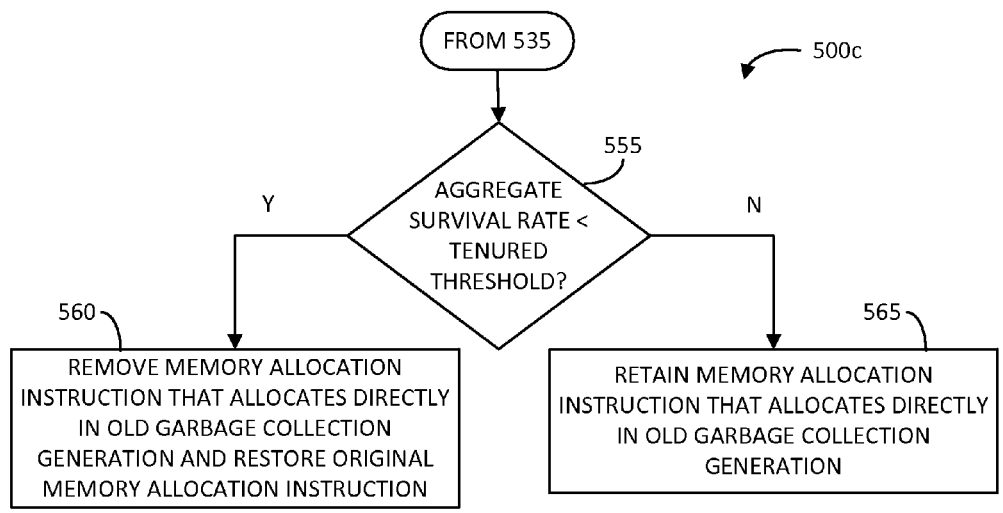

FIGS. 5A-5C are flowcharts illustrating methods 500a, 500b and 500c for implementing memory object pretenuring, according to an implementation. The methods 500 may be implemented using the embodiments and techniques illustrated in FIGS. 1-4. Accordingly, for purposes of illustration, the methods 500a-500c will be described with further reference to FIGS. 1-4. It will be appreciated, however, that the methods 500a-500c can be implemented in apparatus having other configurations and using other approaches for collecting lifetime information, as well as logic flows other than the logic flow illustrated by the state diagram 400.

FIG. 5A illustrates a method 500a that may be used to determine whether objects allocated by a given memory object allocation instruction should be allocated directly in an old garbage collection generation (e.g., pre-tenured) or allocated directly in a young garbage collection generation (e.g., not tenured), such as using the techniques described herein. At block 505, the method 500a includes receiving a set of software instructions (e.g. the application code 110) for execution by a computing device (e.g. a computing device including the virtual machine 120). At block 510, the method 500a includes compiling the set of software instructions (e.g. with the compiler 130) to generate a set of executable instructions. The compiling at block 510 can include identifying a memory object allocation instruction. For instance, compiling the application code 110 at block 510 can include identifying the memory object allocation instruction 210.

At block 515, the method 500a includes executing the set of executable instructions of block 510, where execution can include allocating, with the identified memory object allocation instruction, a plurality of memory objects 230 in a young garbage collection generation (e.g., at state 410 of the state diagram 400). The execution at block 515 can include collecting lifetime data for the memory objects 230, e.g., using instrumentation objects. At block 520, the method 500a includes (e.g., if a number of the plurality of memory objects allocated at block 515 exceeds an allocation threshold) determining a survival rate of the plurality of memory objects. As described herein, the determination at block 520 can be made in response to a garbage collection process being triggered. Though not specifically shown in FIG. 5A, if the number of memory objects allocated at block 515 does not exceed the allocation threshold, the method 500 may return to block 515

At block 525, the method 500a includes determining whether the survival rate of block 520 exceeds a survival rate threshold. If the survival rate does not exceed the survival rate threshold, the method continues to block 530. If survival rate does exceed the survival rate threshold the method continues to block 535. At block 530 (e.g., the survival rate is less than the survival rate threshold), the method 500a includes replacing the memory object allocation instruction identified at block 510 with a memory allocation instruction that directly allocates memory objects in the young garbage collection generation (e.g., to allocate not-tenured memory objects at state 430 of the state diagram 400). At block 535 (e.g., the survival rate is greater than or equal to the survival rate threshold), the method 500a includes replacing the memory object allocation instruction identified at block 510 with a memory allocation instruction that directly allocates memory objects in the old garbage collection generation (e.g., to allocate pre-tenured memory objects at state 420 of the state diagram 400).

FIG. 5B illustrates a method 500b that continues from block 535 of the method 500a (e.g. from state 420 of the state diagram 400). At block 540 of the method 500b, a determination is made whether an aggregate survival rate of old generation memory objects for the application code 110 is greater than or equal to a not-tenured threshold, such as described herein. If the aggregate survival rate is greater than or equal to the non-tenured threshold, the method 500b continues to block 545 and the memory allocation instruction of block 535 (state 420) is removed and replaced with the original memory allocation instruction of block 510 (state 410). However, if the aggregate survival rate, at block 540, is than the non-tenured threshold, the method 500b continues to block 550 and the memory allocation of block 535 is retained (state 420).

FIG. 5C illustrates a method 500c that continues from block 530 of the method 500a (e.g. from state 430 of the state diagram 400). At block 555 of the method 500c, a determination is made whether an aggregate survival rate of old generation memory objects for the application code 110 is less than a tenured threshold, such as described herein. If the aggregate survival rate is less than the tenured threshold, the method 500c continues to block 560 and the memory allocation instruction of block 530 (state 430) is removed and replaced with the original memory allocation instruction of block 510 (state 410). However, if the aggregate survival rate, at block 540, is greater than or equal to the tenured threshold, the method 500c continues to block 565 and the memory allocation of block 530 is retained (state 430).

In one implementation, a computer-implemented method can include receiving, at a computing device, a set of software instructions for execution by the computing device and compiling the set of software instructions to generate a set of executable instructions. The compiling can include identifying a first memory object allocation instruction. The computer-implemented method can further include executing, by the computing device, the set of executable instructions. The executing can include allocating, in a young garbage collection generation, a plurality of memory objects with the first memory object allocation instruction. The computer-implemented method can also include determining a survival rate of the plurality of memory objects allocated by the first memory object allocation instruction. Responsive to the survival rate being larger than (or greater than or equal to) a survival rate threshold, the computer-implemented method can include replacing, in the set of executable instructions, the first memory object allocation instruction with a second memory object allocation instruction that is configured to directly allocate memory objects in an old garbage collection generation.

Implementations can include one or more of the following features. For instance, the replacing can be further responsive to a number of memory objects allocated by the first memory object allocation instruction being greater than an activity threshold value. The compiling the set of software instructions to generate the set of executable instructions can be performed by a first compiler of the computing device and the replacing the first memory allocation instruction with the second memory allocation instruction can be performed by a second compiler of the computing device.

Responsive to the identifying the first memory allocation instruction, the computer-implemented method can include allocating a bookkeeping memory object configured to maintain a count of the plurality of memory objects allocated by the first memory object allocation instruction and maintain a count of a number of the plurality of memory objects allocated by the first memory object allocation instruction that are active (live) during a garbage collection process. The survival rate can be determined based on the count of allocated memory objects and the count of memory objects that are active during the garbage collection process. Allocating an object of the plurality of memory objects can include allocating a shadow object including a pointer to the bookkeeping memory object. The shadow object can be used, during the garbage collection process, to update the count of active memory objects. The computer-implemented method can include, after replacing the first memory allocation instruction with the second memory allocation instruction, resetting, for a third memory allocation instruction, a count of allocated memory objects and a count of active memory objects.

The computer-implemented method can include determining, by the computing device, that a survival rate of old garbage collection generation memory objects associated with the set of executable instructions is below an old generation survival rate threshold. Responsive to the determination that the survival rate of the old garbage collection generation memory objects is below the old generation survival rate threshold, the computer-implemented method can include replacing the second memory allocation instruction with the first memory allocation instruction. The computer-implemented method can include, responsive to the survival rate being less than or equal to the survival rate threshold, replacing, in the set of executable instructions, the first memory object allocation instruction with a second memory object allocation instruction that is configured to directly allocate memory objects in the young garbage collection generation.

In another implementation, a non-transitory recordable storage medium can have instructions recorded and stored thereon. The instructions, when executed by a computing device, can cause the computing device to receive a set of software instructions for execution by the computing device and compile the set of software instructions to generate a set of executable instructions. The compiling can include identifying a first memory object allocation instruction. The instructions, when executed by the computing device, can further cause the computing device to execute the set of executable instructions, where the executing can include allocating, in a young garbage collection generation, a plurality of memory objects with the first memory object allocation instruction. The instructions, when executed by the computing device, can also cause the computing device to determine a survival rate of the plurality of memory objects allocated by the first memory object allocation instruction and, responsive to the survival rate being larger than (or greater than or equal to) a survival rate threshold, replace, in the set of executable instructions, the first memory object allocation instruction with a second memory object allocation instruction that is configured to directly allocate memory objects in an old garbage collection generation.

Implementations can include one or more of the following features. For instance, the replacing can be further responsive to a number of memory objects allocated by the first memory object allocation instruction being greater than an activity threshold value. The compiling the set of software instructions to generate the set of executable instructions can be performed by a first compiler of the computing device and the replacing the first memory allocation instruction with the second memory allocation instruction can be performed by a second compiler of the computing device.

The instructions, when executed by the computing device, can cause the computing device to, responsive to the identifying the first memory allocation instruction, allocate a bookkeeping memory object configured to maintain a count of the plurality of memory objects allocated by the first memory object allocation instruction and maintain a count of a number of the plurality of memory objects allocated by the first memory object allocation instruction that are active during a garbage collection process. The survival rate can be determined based on the count of allocated memory objects and the count of memory objects that are active during the garbage collection process. Allocating an object of the plurality of memory objects can include allocating a shadow object including a pointer to the bookkeeping memory object, the shadow object being used, during the garbage collection process, to update the count of active memory objects.

The instructions, when executed by the computing device, can cause the computing device to, after replacing the first memory object allocation instruction with the second memory object allocation instruction, reset, for a third memory object allocation instruction, a count of allocated memory objects and a count of active memory objects.

The instructions, when executed by the computing device, can cause the computing device to determine that a survival rate of old garbage collection generation memory objects associated with the set of executable instructions is below an old generation survival rate threshold and, responsive to the determination that the survival rate of the old garbage collection generation memory objects is below the old generation survival rate threshold, replace the second memory allocation instruction with the first memory allocation instruction. The instructions, when executed by the computing device, can cause the computing device to, responsive to the survival rate being less than or equal to the survival rate threshold, replace, in the set of executable instructions, the first memory object allocation instruction with a second memory object allocation instruction that is configured to directly allocate memory objects in the young garbage collection generation.

In another implementation, a system can include a first compiler configured to receive a set of software instructions and generate a set of executable instructions from the set of software instructions. The compiling can include identifying a memory object allocation instruction in the set of software instructions and allocating a bookkeeping object associated with the memory object allocation instruction. The bookkeeping object can be configured to maintain information for determining a survival rate of a plurality of memory objects allocated by the memory object allocation instruction. The system can include an execution engine configured to execute the set of executable instructions including updating, in the information for determining the survival rate, a count of a number of allocated memory objects allocated by the memory object allocation instruction. The system can also include a garbage collector configured to update, in the information for determining the survival rate, a count of live memory objects of the plurality of memory objects allocated by the memory object allocation instruction. The system can further include a second compiler configured to determine the survival rate based on the survival rate information. Responsive to the survival rate being larger than (or greater than or equal to) a survival rate threshold, the second compiler can be configured to replace, in the set of executable instructions, the memory object allocation instruction with an old-generation memory object allocation instruction that is configured to directly allocate memory objects in an old garbage collection generation. Responsive to the survival rate being less than or equal to (or less than) a survival rate threshold, the second compiler can be configured to replace, in the set of executable instructions, the memory object allocation instruction with a young-generation memory object allocation instruction that is configured to directly allocate memory objects in a young garbage collection generation.

Implementations can include one or more the following features. For instance, allocating a memory object with the memory object allocation instruction can include allocating a shadow object including a pointer to the bookkeeping object, the shadow object being used, by the garbage collector, to update the count of live memory objects. The replacing the memory object allocation instruction with the old-generation memory object allocation instruction can be further responsive to the count of the number of memory objects allocated by the memory object allocation instruction being greater than an activity threshold value. The replacing the memory object allocation instruction with the young-generation memory object allocation instruction can be further responsive to the count of the number of memory objects allocated by the memory object allocation instruction being greater than an activity threshold value.

Figure 6:
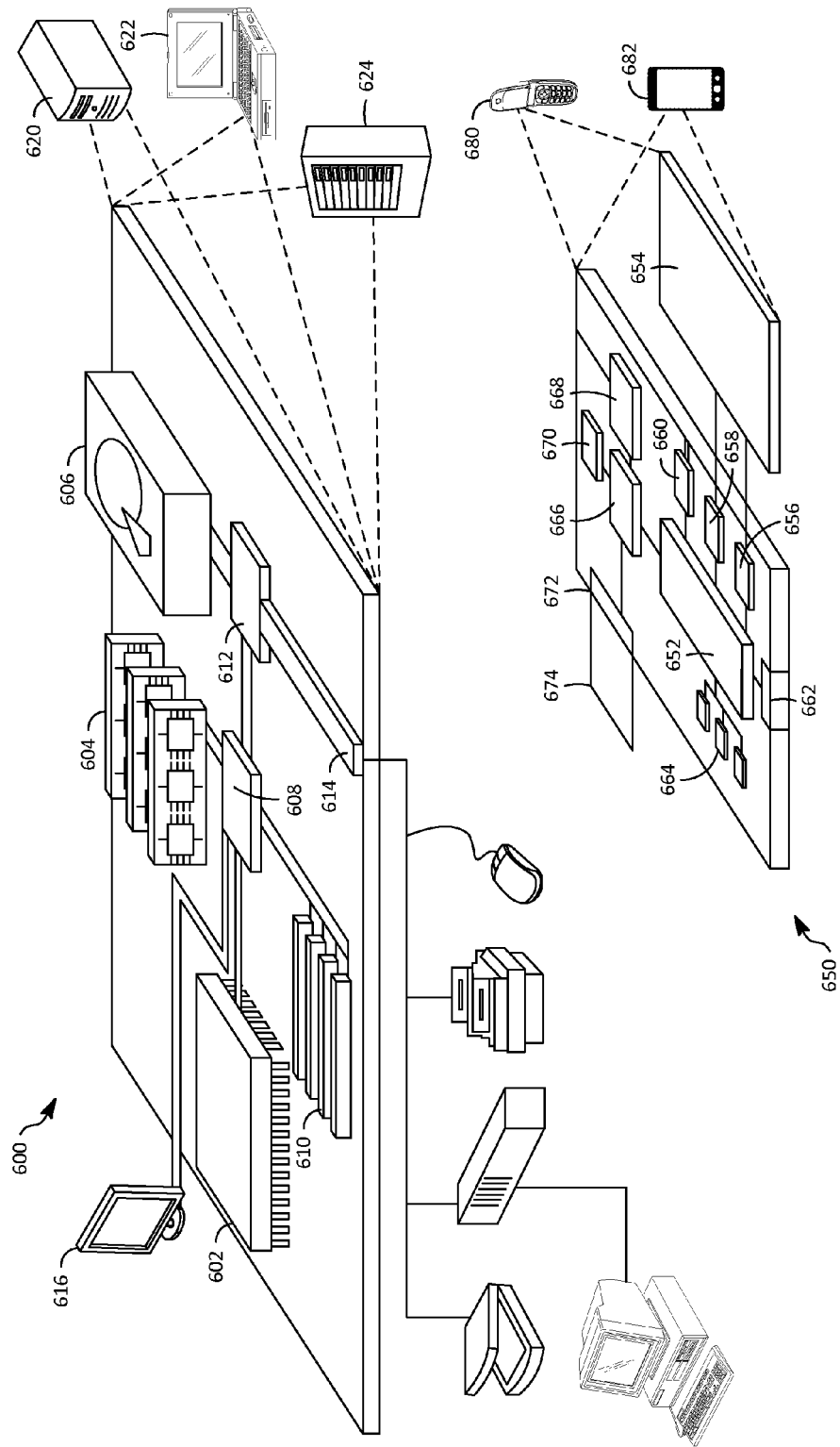
FIG. 6 is a diagram illustrating an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Therefore, other implementations are within the scope of the following claims.

What is claimed is:

1. A computer-implemented method comprising:
   receiving, at a computing device, a set of software instructions for execution by the computing device;
   compiling the set of software instructions to generate a set of executable instructions, the compiling including identifying a first memory object allocation instruction;
   executing, by the computing device, the set of executable instructions, the executing including allocating, in a young garbage collection generation, a plurality of memory objects with the first memory object allocation instruction;
   determining a survival rate of the plurality of memory objects allocated by the first memory object allocation instruction;
   determining a count of a number of memory objects allocated by the first memory allocation instruction; and
   responsive to the survival rate being larger than a survival rate threshold and the count of the number of memory objects allocated by the first memory allocation instruction being larger than an activity rate threshold, replacing, in the set of executable instructions, the first memory object allocation instruction with a second memory object allocation instruction that is configured to directly allocate memory objects in an old garbage collection generation.

2. The computer-implemented method of claim 1, wherein:
   the compiling the set of software instructions to generate the set of executable instructions is performed by a first compiler of the computing device; and
   the replacing the first memory allocation instruction with the second memory allocation instruction is performed by a second compiler of the computing device.

3. The computer-implemented method of claim 1, further comprising:
responsive to the identifying the first memory allocation instruction, allocating a bookkeeping memory object configured to maintain the count of the number of memory objects allocated by the first memory object allocation instruction and maintain a count of a number of memory objects allocated by the first memory object allocation instruction that are active during a garbage collection process, the survival rate being determined based on the count of allocated memory objects and the count of memory objects that are active during the garbage collection process.

4. The computer-implemented method of claim 3, wherein allocating an object of the plurality of memory objects includes allocating a shadow object including a pointer to the bookkeeping memory object, the shadow object being used, during the garbage collection process, to update the count of memory objects that are active during the garbage collection process.

5. The computer-implemented method of claim 3, further comprising, after replacing the first memory allocation instruction with the second memory allocation instruction, resetting, for a third memory allocation instruction, a count of allocated memory objects and a count of active memory objects.

6. The computer-implemented method of claim 1, further comprising:
determining, by the computing device, that a survival rate of old garbage collection generation memory objects associated with the set of executable instructions is below an old generation survival rate threshold; and
responsive to the determination that the survival rate of the old garbage collection generation memory objects is below the old generation survival rate threshold, replacing the second memory allocation instruction with the first memory allocation instruction.

7. The computer-implemented method of claim 1, further comprising:
responsive to the survival rate being less than or equal to the survival rate threshold, replacing, in the set of executable instructions, the first memory object allocation instruction with a second memory object allocation instruction that is configured to directly allocate memory objects in the young garbage collection generation.

8. A non-transitory recordable storage medium having instructions recorded and stored thereon, the instructions, when executed by a computing device, cause the computing device to:
receive a set of software instructions for execution by the computing device;
compile the set of software instructions to generate a set of executable instructions, the compiling including identifying a first memory object allocation instruction;
execute the set of executable instructions, the executing including allocating, in a young garbage collection generation, a plurality of memory objects with the first memory object allocation instruction;
determine a survival rate of the plurality of memory objects allocated by the first memory object allocation instruction;
determine a count of a number of memory objects allocated by the first memory allocation instruction; and
responsive to the survival rate being larger than a survival rate threshold and the count of the number of memory objects allocated by the first memory allocation instruction being larger than an activity rate threshold, replace, in the set of executable instructions, the first memory object allocation instruction with a second memory object allocation instruction that is configured to directly allocate memory objects in an old garbage collection generation.

9. The non-transitory recordable storage medium of claim 8, wherein:
the compiling the set of software instructions to generate the set of executable instructions is performed by a first compiler of the computing device; and
the replacing the first memory allocation instruction with the second memory allocation instruction is performed by a second compiler of the computing device.

10. The non-transitory recordable storage medium of claim 8, wherein the instructions, when executed by the computing device, further cause the computing device to:
responsive to the identifying the first memory allocation instruction, allocate a bookkeeping memory object configured to maintain the count of the number of memory objects allocated by the first memory object allocation instruction and maintain a count of a number of memory objects allocated by the first memory object allocation instruction that are active during a garbage collection process, the survival rate being determined based on the count of allocated memory objects and the count of memory objects that are active during the garbage collection process.

11. The non-transitory recordable storage medium of claim 10, wherein allocating an object of the plurality of memory objects includes allocating a shadow object including a pointer to the bookkeeping memory object, the shadow object being used, during the garbage collection process, to update the count of memory objects that are active during the garbage collection process.

12. The non-transitory recordable storage medium of claim 10, wherein the instructions, when executed by the computing device, further cause the computing device to, after replacing the first memory object allocation instruction with the second memory object allocation instruction, reset, for a third memory object allocation instruction, a count of allocated memory objects and a count of active memory objects.

13. The non-transitory recordable storage medium of claim 8, wherein the instructions, when executed by the computing device, further cause the computing device to:
determine that a survival rate of old garbage collection generation memory objects associated with the set of executable instructions is below an old generation survival rate threshold; and
responsive to the determination that the survival rate of the old garbage collection generation memory objects is below the old generation survival rate threshold, replace the second memory allocation instruction with the first memory allocation instruction.

14. The non-transitory recordable storage medium of claim 8, wherein the instructions, when executed by the computing device, further cause the computing device to:
responsive to the survival rate being less than or equal to the survival rate threshold, replace, in the set of executable instructions, the first memory object allocation instruction with a second memory object allocation instruction that is configured to directly allocate memory objects in the young garbage collection generation.

15. A system comprising:
a first compiler configured to:
receive a set of software instructions;
generate a set of executable instructions from the set of software instructions including:
identifying a memory object allocation instruction in the set of software instructions; and
allocating a bookkeeping object associated with the memory object allocation instruction, the bookkeeping object being configured to maintain information for determining a survival rate of a plurality of memory objects allocated by the memory object allocation instruction;
an execution engine configured to execute the set of executable instructions including updating, in the information for determining the survival rate, a count of a number of allocated memory objects allocated by the memory object allocation instruction;
a garbage collector configured to update, in the information for determining the survival rate, a count of live memory objects of the plurality of memory objects allocated by the memory object allocation instruction; and
a second compiler configured to:
determine the survival rate based on the survival rate information;
responsive to the survival rate being larger than a survival rate threshold and the count of the number of allocated memory objects allocated by the memory object allocation instruction, replace, in the set of executable instructions, the memory object allocation instruction with an old-generation memory object allocation instruction that is configured to directly allocate memory objects in an old garbage collection generation; and
responsive to the survival rate being less than or equal to a survival rate threshold, replace, in the set of executable instructions, the memory object allocation instruction with a young-generation memory object allocation instruction that is configured to directly allocate memory objects in a young garbage collection generation.

16. The system of claim 15, wherein allocating a memory object with the memory object allocation instruction includes allocating a shadow object including a pointer to the bookkeeping object, the shadow object being used, by the garbage collector, to update the count of live memory objects.

17. The system of claim 15, wherein the replacing the memory object allocation instruction with the young-generation memory object allocation instruction is further responsive to the count of the number of memory objects allocated by the memory object allocation instruction being greater than an activity threshold value.

* * * * *